Jan. 11, 1938.    W. S. SAUNDERS    2,104,770
STORAGE BATTERY INSTALLATION
Filed Aug. 21, 1936    2 Sheets-Sheet 1
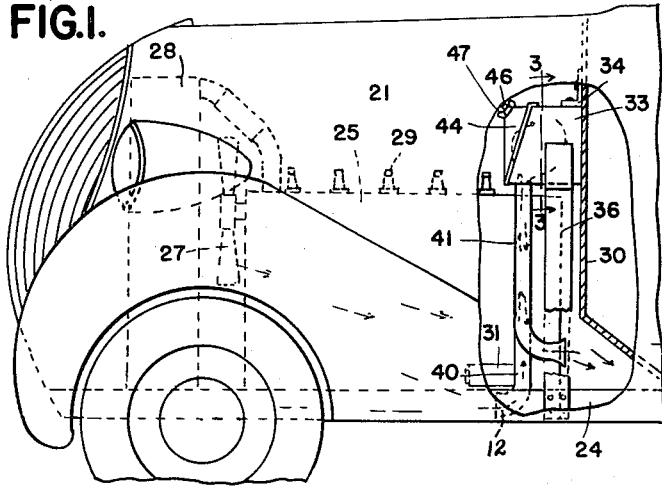
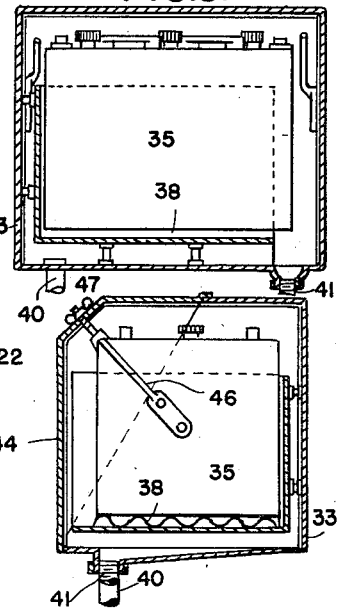
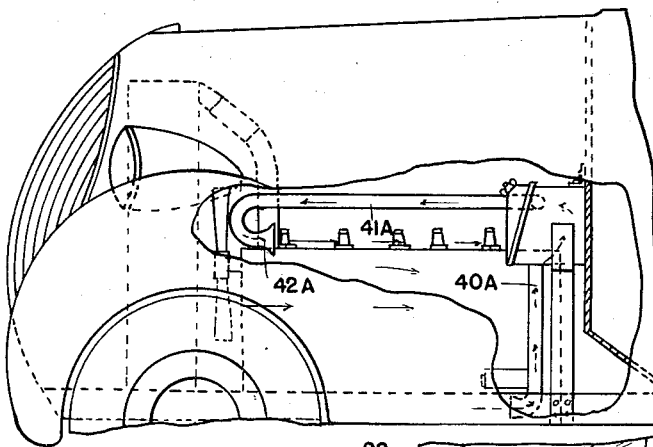
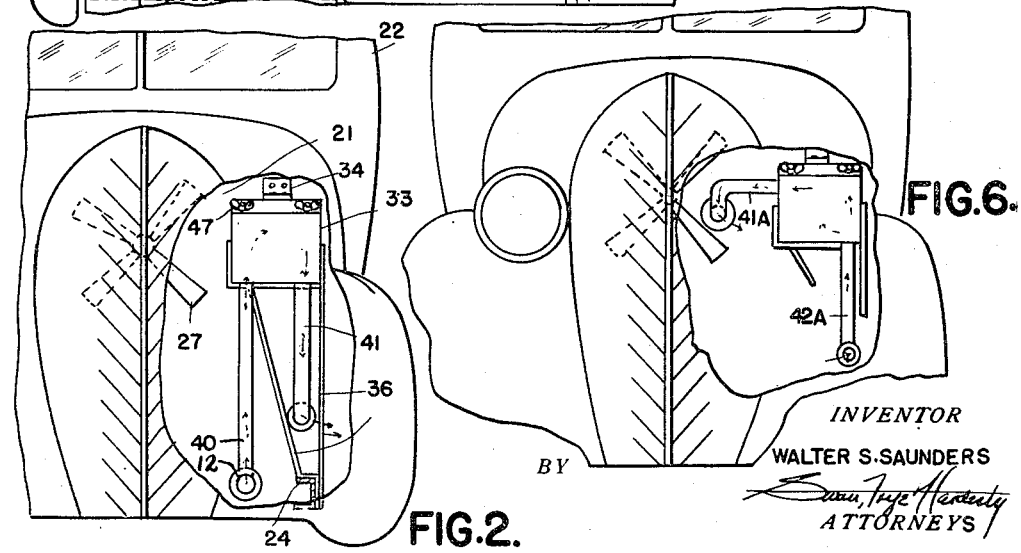
INVENTOR
WALTER S. SAUNDERS
BY
ATTORNEYS

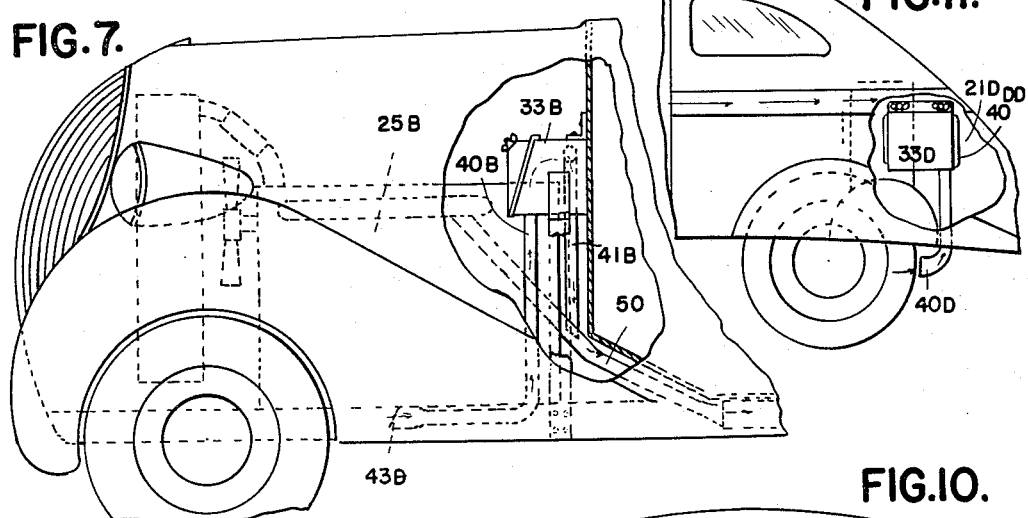
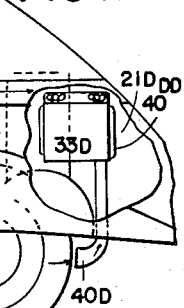
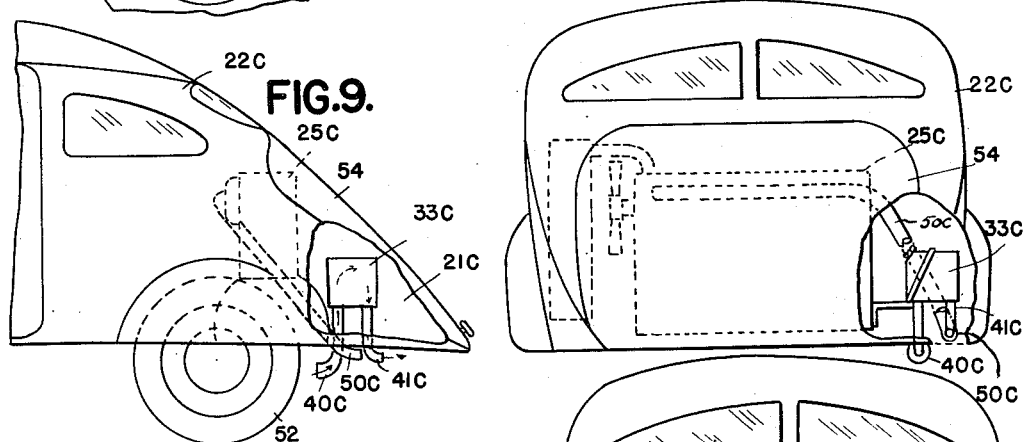
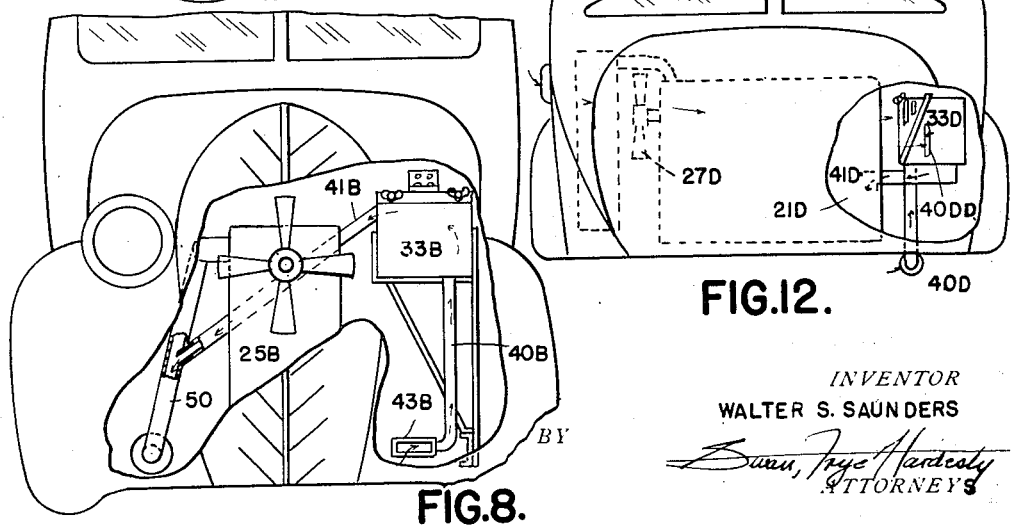

Patented Jan. 11, 1938

2,104,770

UNITED STATES PATENT OFFICE 2,104,770

STORAGE BATTERY INSTALLATION

Walter S. Saunders, Pontiac, Mich., assignor to The American Forging & Socket Company, Pontiac, Mich., a corporation of Michigan Application August 21, 1936, Serial No. 97,213

4 Claims. (Cl. 180—68.5)

This invention relates to the installation of storage batteries in automotive vehicles, and constitutes a further development of the invention set forth in my previously filed copending application Serial No. 64,909, filed February 20, 1936.

An object of the present invention is to provide simplified means for rigidly supporting the battery in a position close to the engine, and to the electrical elements appurtenant the same and which are to be connected to the battery, while stresses due to the weight of the battery are imposed directly on the frame of the vehicle, as well as to incorporate novel ventilating means arranged to cooperate with the cooling system of the motor, to induce a blast of air through the battery box, and to locate the box in a position adjacent the engine but protected against the heat generated thereby.

Other objects include the provision of improved and simplified means whereby the air draft which flows through the engine compartment by reason of the movement of the vehicle, and which is also induced by the cooling fan, is utilized both to force air into and to draw it out of the battery box. A further object is the arrangement of the air inlet portions in such fashion that unduly heated air is not allowed to flow into the box, as well as the provision of means whereby, regardless of the relative location of the engine and battery, and of the air inlet opening to the box, a draft of cool air is forced by the exhaust of the engine to flow through the battery box.

Other objects and advantages will be apparent from the following description, wherein reference is made to the accompanying drawings illustrating preferred embodiments of my invention, and wherein similar reference numerals designate similar parts throughout the several views.

In the drawings:

Figure 1 is a somewhat diagrammatic and fragmentary side elevational view of the forward portion of a motor car provided with a storage battery installation incorporating the principles of the present invention, parts being broken away to afford a better view of the ventilating means.

Figure 2 is a front elevational view, also of diagrammatical and fragmentary nature, of the vehicle, partly broken away to show the battery installation.

Figure 3 is a longitudinal section of the battery box, taken substantially on the line 3—3 of Figure 1 and looking in the direction of the arrows.

Figure 4 is a cross section of the battery box.

Figures 5 and 6 are side and front elevational views, similar to Figures 1 and 2 respectively, but showing a somewhat modified construction.

Figures 7 and 8 are similar side and front elevational views of a vehicle incorporating the invention in another modified form.

Figure 9 is a fragmentary and somewhat diagrammatic elevational view of the rear portion of a vehicle having the engine located in the rear, illustrating an application of the present invention thereto.

Figure 10 is a rear view of the same.

Figures 11 and 12 are side and rear elevational views, similar to Figures 9 and 10 respectively, of a further modification.

Referring now to the drawings: Reference character 21 designates the engine compartment of a vehicle, which also incorporates a passenger compartment 22 and a frame 24. In the engine compartment is an internal combustion engine 25, which is shown disposed therein in more or less conventional arrangement, carrying at its front end a cooling fan 27 and radiator 28. A blast of air through the radiator, over the engine, and downwardly beneath the passenger compartment is induced both by movement of the vehicle and by the fan 27. Incorporated with the engine are electrically operable elements such as the spark plugs 29 and the electric starter 31.

The passenger compartment is shown separated from the engine compartment by a dash 30, upon which, above and at one side of the engine, is arranged a battery box 33, fastened by a bracket as 34 to the front of the dash within the engine compartment and supported from the frame member 24 of the vehicle by upright members 36. The interior of the box may be insulated to protect it against the heat developed by the engine, and inlet and outlet openings (undesignated) may be formed in the floor thereof near opposite ends of the box. The battery 35 is preferably supported in spaced relation to the floor and sides of the box as by the combined supporting and baffle element 38, which so covers the inlet opening (into connection with which the inlet conduit 40 extends) that inlet air is made to travel upwardly and over the top of the battery before it can pass downward and out through the exhaust conduit 41, which opens directly into the interior of the box and is, as best shown in Figures 3 and 4, prevented by the portion 38 from drawing air directly from the inlet.

A cover 44 enables the battery to be reached from within the engine compartment, the cover being shown secured as by stay bolts 46 and wing nuts 47.

It will be understood that when the vehicle is in motion, unheated air which has not passed through the radiator or over the engine, passes beneath the engine compartment. This natural air stream tends to prevent the air thrown by the fan from traveling downward, forcing it to move more nearly straight to the rear. For this reason the inlet conduit 40 preferably projects to a position below the engine and into the path of such stream of unheated air, where it is provided with a forwardly opening mouth 42. The mouth is located at such height, however, that when the vehicle is standing still, a portion of the air blast from the fan, which is then free to spread downward, may also find its way thereto. The outlet conduit is not extended into the zone of unheated or less heated air, but terminates in the path of the blast created by the fan, is directed rearwardly, and provided with a mouth opening in the direction of such air travel.

As indicated in Figures 5 and 6, the outlet conduit as 41A may be projected forwardly from the battery box to a position directly behind the fan, and there provided with a rearwardly directed opening as 42A located in the zone of strongest air blast. With the outlet so located, the location of the inlet becomes less important, inasmuch as ample circulation through the box is induced by the stronger ejecting action at the outlet, although the inlet conduit 40A is shown similarly projected to a position beneath the engine compartment, and provided with an opening adapted to scoop unheated air from the stream beneath the vehicle, and assist its induction into the box.

An alternative method of inducing a positive outflow, in order to insure maintenance of circulation through the box regardless of the conditions as to the flow of air at the outlet, is shown in Figures 7 and 8, in which the battery 33B, similarly supported and located, is provided with an outlet conduit 41B connected to the exhaust pipe 50 of the engine (25B) in such manner that air from the box is entrained and forced to flow therefrom by the rapidly moving exhaust gases traveling through pipe 50. The air from the battery box is thus discharged with the exhaust, and the reduction of air pressure within the box induces a positive inflow through inlet pipe 40B, which pipe is shown projected forwardly beneath the engine (Figure 7) to such position that interception of only unheated air is assured, while the forwardly opening mouth 42B is arranged by its scooping effect to assist the airflow into the box.

In the modified construction shown in Figures 9 and 10, the engine 25C is located at the rear of the vehicle 22C, and arranged in transverse position behind the rear wheels 52 in the overhanging body and beneath a hatch 54. Also in such overhang and farther to the rear is the battery box 33C, which may be constructed similarly to the box first described, and also is accessible through the hatch 54. The engine compartment 21C is preferably closed at the bottom by a floor (undesignated), through which projects the exhaust pipe 50C of the engine. Air inlet and outlet conduits, 40C—41C, respectively, also project from the battery box 33C downwardly through the floor. The inlet conduit opens forwardly beneath the vehicle in position to intercept air from the stream therebeneath and assist its induction into the box, while the outlet conduit 41C opens rearwardly in such manner that the airflow beneath the vehicle also assists outflow of air through such pipe. Preferably also, the discharge opening of outlet conduit 41C is located directly behind and arranged to discharge in the same direction as the exhaust pipe 50C, so that the blast of the latter also greatly assists the positive withdrawal of air from the battery box.

In Figures 11 and 12 a battery box 33D, similarly located in a rear engine compartment 21D, is provided with an inlet conduit 40D disposed in like fashion. The box is also equipped with air inlet louvers 40DD formed directly in the sides of the box, and its cover, and opening in such direction as to intercept the air-flow induced over the motor by the fan 27D. When two inflow means are provided in such fashion, the arrangement of the discharge of the box becomes less important. In the shown construction the outlet conduit 41D discharges directly into the engine compartment 21D, which compartment may be open at the bottom. Preferably the outlet opens in the direction of the air-flow at the point of its discharge.

What I claim is:

1. In combination with an automotive vehicle incorporating electrically operable elements and including a frame, an engine compartment through which movement of the vehicle tends to induce an air blast, an engine in the engine compartment, means for cooling the engine including a fan arranged to induce an air blast thereover in the same direction as air is induced to flow thereover by movement of the vehicle, one or more of said electrically operable elements being appurtenant said engine, a storage battery for supplying current to said electrically operable elements, and means for supporting and ventilating said battery including a battery box having at least a portion thereof in but isolated from the engine compartment, said box having air inlet and outlet portions, means for supporting the box from the frame of the vehicle in a position above the engine, and air inducting and educting conduit elements connected to said inlet and outlet portions respectively and extending downwardly from the box into the area of the air blast around the engine, the inducting conduit element projecting below the engine and opening forwardly with respect to such air blast, and the educting conduit element opening rearwardly with respect to such air blast.

2. Battery supporting and ventilating means as set forth in claim 1 in which the box is arranged near the opposite end of the motor from the fan and the air educting conduit element projects to a position directly behind the fan and is provided with a mouth opening away from the fan.

3. Battery supporting and ventilating means as set forth in claim 1 in which the battery box is arranged near the opposite end of the motor from the fan, and the air educting conduit element projects to a position adjacent the fan and is provided with a mouth opening away from the same, and in which the air inducting conduit projects to a position outside the engine compartment to intercept unheated air and assist its induction into the box.

4. In combination with an automotive vehicle incorporating electrically operable elements and including a frame, an engine compartment through which movement of the vehicle tends to induce an air blast, an engine in the engine compartment, means for cooling the engine including a fan arranged to induce an air blast thereover in the same direction as air is induced to flow thereover by movement of the vehicle, one or more of said electrically operable elements being appurtenant said engine, a storage battery for supplying current to said electrically operable elements, and means for supporting and ventilating said battery including a battery box having at least a portion thereof in but isolated from the engine compartment, said box having air inlet and outlet portions, means for supporting the box from the frame of the vehicle in a position above the engine, and air inducting and educting conduit elements connected to said inlet and outlet portions respectively and extending into the area of the air blast around the engine, the inducting conduit element projecting below the engine and opening forwardly with respect to such air blast, and the educting conduit element opening rearwardly with respect to such air blast.

WALTER S. SAUNDERS.